United States Patent
Fujishima et al.

(10) Patent No.: US 6,662,073 B1
(45) Date of Patent: Dec. 9, 2003

(54) APPARATUS AND METHOD FOR MACHINING SIMULATION FOR NC MACHINING

(75) Inventors: Makoto Fujishima, Yamatokoriyama (JP); Yasushi Fukaya, Niwa-gun (JP); Kazuo Yamazaki, 1500 7th St., #7-0, Sacramento, CA (US) 95814

(73) Assignees: Mori Seiki Co., Ltd., Yamatokoriyama (JP); Okuma Corporation, Nagoya (JP); Kazuo Yamazaki, Sacramento, CA (US)

( * ) Notice: Subject to any disclaimer, the term of this patent is extended or adjusted under 35 U.S.C. 154(b) by 85 days.

(21) Appl. No.: 10/049,628
(22) PCT Filed: Jun. 30, 2000
(86) PCT No.: PCT/JP00/04393
§ 371 (c)(1),
(2), (4) Date: Feb. 22, 2002
(87) PCT Pub. No.: WO02/03155
PCT Pub. Date: Jan. 10, 2002

(51) Int. Cl.[7] ............................................. G05B 19/40
(52) U.S. Cl. .................. 700/173; 700/96; 700/109; 700/118; 700/182
(58) Field of Search ................ 700/96, 109, 118, 700/173, 182

(56) References Cited

U.S. PATENT DOCUMENTS 5,319,357 A * 6/1994 Diei et al. .................. 340/680
5,691,909 A * 11/1997 Frey et al. .................. 700/159
5,913,955 A * 6/1999 Redmond et al. ............ 82/1.11
6,266,572 B1 * 7/2001 Yamazaki et al. ............ 700/96

OTHER PUBLICATIONS

Patent Abstract of Japan, Pub. No. 07–195255, dated Aug. 1, 1995. See PCT search rpt.
Patent Abstract of Japan, Pub. No. 2000–084794, dated Mar. 28, 2000. See PCT search rpt.
Patent Abstract of Japan, Pub. No. 04–205210, dated Jul. 27, 1992. See PCT search rpt.
Patent Abstract of Japan, Pub. No. 63–273910, dated Nov. 11, 1988. See PCT search rpt.
Patent Abstract of PCT No. WO98/19822, dated May 14, 1998.
Patent Abstract of Japan, Pub. No.63–002642, dated Jan. 7, 1988.

(List continued on next page.)

*Primary Examiner*—Leo Picard
*Assistant Examiner*—Michael D Masinick
(74) *Attorney, Agent, or Firm*—Armstrong, Westerman & Hattori, LLP

(57) ABSTRACT

A machining simulation is performed on a graphic data basis prior to machining. Machining simulation means (17) simulates a forced-vibration frequency and/or a load variation frequency occurring due to interrupted cutting on the basis of machining information, and numerical control command generating means (18) generates a numerical control command on the basis of the frequencies obtained from the machining simulation means (17). A spindle rotation speed can be reflected on the actual machining and the generation of a machining program under conditions optimum for the actual machining. Therefore, the interrupted-cutting forced-vibration frequency and/or load variation frequency, or harmonic frequencies thereof which are integral multiples thereof are prevented from being close to the natural frequency of a machine, a tool, a jig or a workpiece. Thus, chattering due to resonance can be prevented, thereby improving a surface accuracy.

13 Claims, 10 Drawing Sheets

OTHER PUBLICATIONS

Patent Abstract of Japan, Pub. No. 03–003757, dated Jan. 9, 1991.

Patent Abstract of Japan, Pub. No. 06–019527, dated Jan. 28, 1994.

Patent Abstract of Japan, Pub. No. 05–31647, dated Feb. 9, 1993.

Patent Abstract of Japan, Pub. No. 06–262484, dated Sep. 20, 1994.

Patent Abstract of Japan, Pub. No. 59–232749, dated Dec. 27, 1984.

Patent Abstract of Japan, Pub. No. 06–155245, dated Jun. 3, 1994.

Patent Abstract of Japan, Pub. No. 07–314290, dated Dec. 5, 1995.

Patent Abstract of Japan, Pub. No. 63–114852, dated May 19, 1988.

Patent Abstract of Japan, Pub. No. 07–020916, dated Jan. 24, 1995.

* cited by examiner

FIG. 7
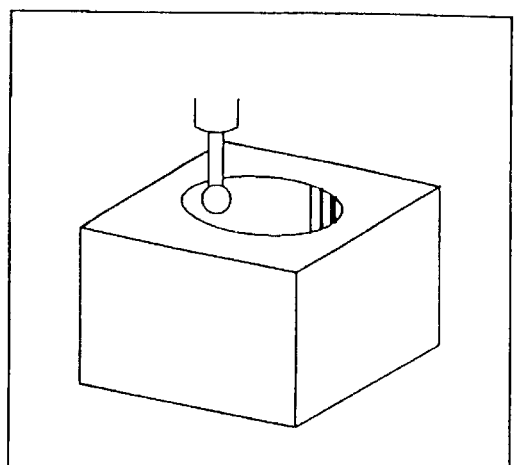
BLANK STOCK MEASURING SECTION
MEASUREMENT RESULTS
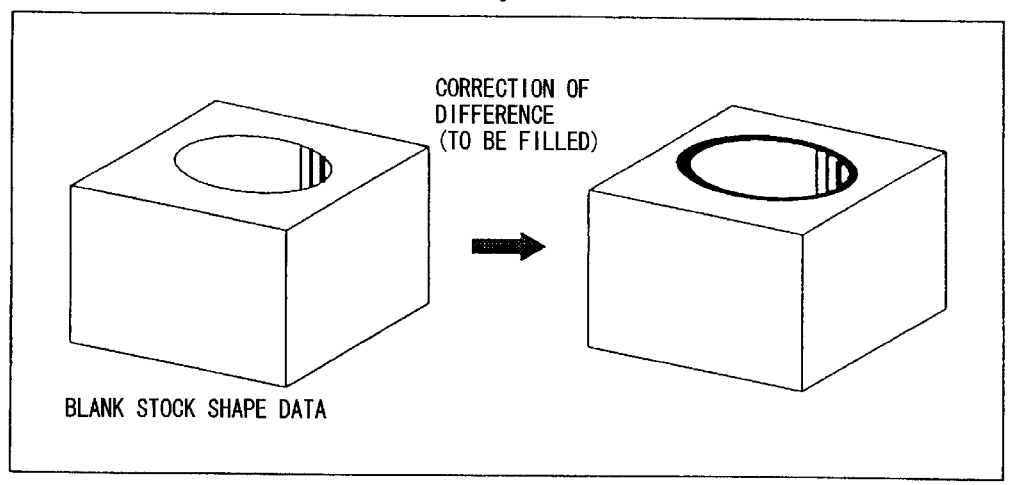
BLANK STOCK SHAPE DATA
CORRECTION OF DIFFERENCE (TO BE FILLED)
SIMULATION SHAPE DATA MEMORY $z(x)(y) = h1 \rightarrow (h1-1)$ $P(x, y, h1) = 1 \rightarrow 0$

THEORETICAL CURVE

DIVISION OF ANGLE OF EACH TOOL TURN

RESULTS OF SIMULATION

ACCUMULATION OF RESULTS OF SIMULATION (SINGLE-TOOTH TOOL)

ACCUMULATION OF RESULTS OF SIMULATION (DOUBLE-TOOTH TOOL)

APPARATUS AND METHOD FOR MACHINING SIMULATION FOR NC MACHINING

TECHNICAL FIELD

The present invention relates to a machining simulation apparatus and method for NC machining and, more particularly, to an apparatus and a method for generating a numerical control command on the basis of a machining simulation performed on the basis of blank stock shape data, tool shape data and data specifying a workpiece shape.

BACKGROUND ART

An adaptive control command generating system for a conventional numerical control system will be described with reference to a block diagram in FIG. 1.

An NC program for use in a machining operation to be performed is stored in an NC program memory 11.

An NC program interpreting section 12 reads NC program blocks on a one-by-one basis from the NC program memory 11, and interprets an NC program block to output an interpolation type, a target position and a feed rate specified in the current block or those specified on a modal basis in a previous block to an interpolating section 13.

The interpolating section 13 calculates movement amounts $\Delta x$, $\Delta y$, $\Delta z$ along the respective axes per unit time (interpolation cycle period) on the basis of the interpolation type, the target position and the feed rate, and outputs the movement amounts to a servo control section 14.

The servo control section 14 controls the rotations of axial motors on the basis of the movement amounts $\Delta x$, $\Delta y$, $\Delta z$ along the respective axes per unit time obtained from the interpolating section 13 to perform axial operations.

A cutting monitoring section 15 receives a spindle load and feed axis loads actually detected by the servo control section 14, and outputs at least one of these loads to an adaptive control section 16.

The adaptive control section 16 compares the spindle load and the feed axis loads obtained from the cutting monitoring section 15 with predetermined values. If the spindle load and the feed axis loads are greater than a predetermined overload judgment value, the adaptive control section 16 issues an alarm and outputs a command for stopping the axial operations to the interpolating section 13. If the spindle load and the feed axis loads fall outside a predetermined rate control detection range, the adaptive control section 16 outputs a rate change command for increasing or reducing a feed rate to the interpolating section 13. If the spindle load and the feed axis loads are lower than a predetermined air-cut judgment value, the adaptive control section 16 outputs a feed rate command suitable for air-cut to the interpolating section 13.

On the basis of these commands, the interpolating section 13 re-calculates the movement amounts $\Delta x$, $\Delta y$, $\Delta z$ along the respective axes per unit time (interpolation cycle period), and outputs the re-calculated movement amounts to the servo control section 14.

The aforesaid process is repeated until the machining operation ends.

With reference to a block diagram in FIG. 2, an explanation will be given to a conventional NC program generating system.

An operator inputs information such as a tool type, a tool size, a blank stock material and a machining path required for the generation of an NC program to a machining data inputting section 21. The input result is outputted to an NC program generating section 23.

A cutting condition data table 22 is in a data table form which allows for determination of an optimum feed rate, an optimum spindle rotation speed and the like on the basis of the tool type, the tool size and the blank stock material and the like, and referred to by the NC program generating section 23.

The NC program generating section 23 generates the NC program on the basis of machining data such as the tool type, the tool size, the blank stock material and the machining path outputted from the machining data inputting section 21, and cutting conditions such as the feed rate and the spindle rotation speed read out of the cutting condition data table 22 on the basis of the tool type, the tool size, the blank stock material and the like.

A table data modifying section 24 outputs a command for modification of a relational table indicative of a relationship of the tool type, the tool size, the blank stock material and the like with the feed rate, the spindle rotation speed and the like.

An NC program editing section 25 allows the operator to directly edit the NC program.

In the NC program generating system having the aforesaid construction, the operator selects one of the following three methods for changing the feed rate or the like in the NC program.

The operator specifies the feed rate or the like directly from the machining data inputting section 21. Alternatively, the operator inputs an instruction for modification of the relational table indicative of the relationship of the tool type, the tool size, the blank stock material and the like with the feed rate, the spindle rotation speed and the like in the table data modifying section 24. Alternatively, the operator changes an F-command or the like in the NC program editing section 25.

In the adaptive control command generating system for the conventional numerical control system, machining state information indicative of the spindle load, the feed axis loads and the like is fed back at a high speed but, even if so, a response delay is inevitable because of operating principles. Accordingly, there is no choice but to perform a "present" control operation on the basis of "old" information.

Where a machining operation with a small machining load follows a machining operation with a great machining load, the feed rate is controlled to be reduced even though the actual machining load is small. This results in a reduction in machining efficiency. Where a machining operation with a great machining load follows a machining operation with a small machining load, the feed rate is controlled to be increased even though the actual machining load is great. This results in an overload on a tool, failing to provide a proper surface roughness.

In the conventional NC program generating system, the cutting conditions such as the spindle rotation speed are specified by the operator according to his own judgment, or uniquely determined on the basis of the tool type, the tool size, the blank stock material and the like. Therefore, the cutting conditions are irrelevant to a forced-vibration frequency and a load variation frequency occurring due to interrupted cutting.

This makes it very difficult to continuously perform a cutting operation at an optimum spindle rotation speed or at an optimum cutting speed, leading to early tool wear and deterioration in machining accuracy and surface roughness. Where the interrupted-cutting forced-vibration frequency and load variation frequency, or harmonic frequencies thereof which are integral multiples thereof are close to the natural frequency of a machine, a tool, a jig, a workpiece or the like, chattering of several tens micrometers occurs due to resonance. As a result, periodic wave marks are formed on a surface of a workpiece thereby to deteriorate the surface roughness.

A conventional method to be taken when the chattering occurs is to change the frequency of the interrupted cutting (in general, the spindle rotation speed) so as to prevent the interrupted cutting frequency from being close to the natural frequency of the machine, the tool, the jig, the workpiece or the like.

However, this method heavily relies on a cut-and-try approach. Further, when the chattering is detected during a trial cutting operation, it is necessary to find conditions for elimination of the chattering. This operation is disadvantageously time-consuming even if performed by a skilled operator.

To overcome the aforesaid problem, it is an object of the present invention to provide a machining simulation apparatus and method for NC machining, wherein a machining simulation is performed on a graphic data basis prior to machining, and a spindle rotation speed is reflected on the actual machining and the generation of a machining program under conditions optimum for the actual machining on the basis of an interrupted-cutting forced-vibration frequency and load variation frequency obtained through the machining simulation.

DISCLOSURE OF THE INVENTION

There is provided an apparatus for performing a machining simulation for NC machining on the basis of machining information, the apparatus comprising: machining simulation means for simulating a forced-vibration frequency and a load variation frequency occurring due to interrupted cutting on the basis of the machining information; and numerical control command generating means for generating a numerical control command on the basis of the interrupted-cutting forced-vibration frequency and load variation frequency obtained from the machining simulation means, whereby the aforesaid object is achieved.

The machining simulation is performed on a graphic data basis prior to machining, so that a spindle rotation speed can be reflected on the actual machining and the generation of a machining program under conditions optimum for the actual machining on the basis of the interrupted-cutting forced-vibration frequency and load variation frequency obtained through the machining simulation. Therefore, the interrupted-cutting forced-vibration frequency and load variation frequency, or harmonic frequencies thereof which are integral multiples thereof are prevented from being close to the natural frequency of a machine, a tool, a jig or a workpiece. Thus, chattering can be prevented, thereby improving a surface accuracy.

Further, the machining information includes an NC program, blank stock shape data and tool shape data, whereby the aforesaid object is achieved.

The machining simulation means calculates the interrupted-cutting forced-vibration frequency on the basis of a spindle rotation speed specified in the NC program and a tool tooth number specified in the tool shape data, whereby the aforesaid object is achieved.

The machining simulation means includes: blank stock shape data generating means which converts the blank stock shape data into machining simulation shape data defined by three-dimensional lattice points prior to the simulation; simulation shape storage means for storing the machining simulation shape data; and cutting amount calculating means which calculates a cutting amount indicative of a volume to be removed when a tool passes through a portion of a stock blank represented by the lattice points on the basis of the NC program and the tool shape data, and updates information indicative of presence or absence of lattice points in the blank stock portion through which the tool passes in accordance with the removal, wherein the cutting load variation frequency is calculated on the basis of the spindle rotation speed specified in the NC program, the tool shape data and the cutting amount calculating means, whereby the aforesaid object is achieved.

The machining simulation means may include: blank stock shape data generating means which converts the blank stock shape data into machining simulation shape data by defining a bottom face of a blank stock specified in the blank stock shape data by lattice points and defining a height of the blank stock by vertical height data of each of the lattice points prior to the simulation; simulation shape storage means for storing the machining simulation shape data; and cutting amount calculating means which calculates a cutting amount indicative of a volume to be removed when a tool passes through a portion of the blank stock represented by the lattice points on the basis of the NC program and the tool shape data, and updates the vertical height data of lattice points of the blank stock portion through which the tool passes in accordance with the removal, wherein the cutting load variation frequency is calculated on the basis of the spindle rotation speed specified in the NC program, the tool shape data and the cutting amount calculating means, whereby the aforesaid object is achieved.

The vertical height data includes height data of a solid blank stock portion, or includes height data of a hollow blank stock portion in combination with height data of a solid blank stock portion, whereby the aforesaid object is achieved.

The numerical control command generating means generates an NC program, NC program decode data obtained by decoding the NC program in a numerical controller, or a cutting speed determined on the basis of the NC program decode data so that the interrupted-cutting forced-vibration frequency and load variation frequency obtained from the machining simulation means or harmonic frequencies thereof which are integral multiples thereof fall outside a predetermined range including a natural frequency of the machine, the tool, the jig or the workpiece, whereby the aforesaid object is achieved.

The blank stock shape data is shape data obtained through the machining simulation on the basis of inputted workpiece shape data, or data obtained by correcting a part of the shape data obtained through the machining simulation with the use of shape data obtained by actual measurement on the workpiece, whereby the aforesaid object is achieved.

The tool shape data may be data obtained by correcting inputted tool shape data with the use of shape data obtained by actual measurement on the tool, whereby the aforesaid object is achieved.

Further, there is provided a method for performing a machining simulation for NC machining on the basis of machining information, the method comprising: a machining simulation step for simulating a forced-vibration frequency and a load variation frequency occurring due to interrupted cutting on the basis of the machining information; and a numerical control command generating step for generating a numerical control command on the basis of the interrupted-cutting forced-vibration frequency and load variation frequency obtained in the machining simulation step, whereby the aforesaid object is achieved.

In the numerical control command generating step, an NC program, NC program decode data obtained by decoding the NC program in a numerical controller, or a cutting speed determined on the basis of the NC program decode data is generated so that the interrupted-cutting forced-vibration frequency and load variation frequency obtained from the machining simulation means or harmonic frequencies thereof which are integral multiples thereof fall outside a predetermined range including a natural frequency of a machine, a tool, a jig or a workpiece, whereby the aforesaid object is achieved.

To achieve the aforesaid object, there is provided a medium storing thereon a program, which causes a computer to perform a machining simulation step for simulating a forced-vibration frequency and a load variation frequency occurring due to interrupted cutting on the basis of machining information, and a numerical control command generating step for generating a numerical control command on the basis of the interrupted-cutting forced-vibration frequency and load variation frequency.

By the program for performing the machining simulation step, an NC program, NC program decode data obtained by decoding the NC program in a numerical controller, or a cutting speed determined on the basis of the NC program decode data is generated so that the interrupted-cutting forced-vibration frequency and load variation frequency or harmonic frequencies thereof which are integral multiples thereof fall outside a predetermined range including a natural frequency of a machine, a tool, a jig or a workpiece.

BRIEF DESCRIPTION OF THE DRAWINGS

FIG. 7 is a diagram for explaining how to correct blank stock shape data on the basis of the results of actual measurement on a workpiece in accordance with the present invention;

BEST MODE FOR CARRYING OUT THE PRESENT INVENTION

In a machining simulation apparatus and method for NC machining in accordance with a first embodiment of the present invention, a machining simulation is performed on the basis of blank stock shape data and tool shape data on a real-time basis, and a numerical control command is preliminarily generated on the basis of an interrupted-cutting forced-vibration frequency and load variation frequency obtained through the machining simulation for controlling a spindle rotation speed at an optimum level.

The present invention to be herein explained is employed in combination with a machining simulation apparatus for NC machining disclosed in WO98/19822 (PCT/JP96/03266) previously filed by the applicant of the present invention. Thus, a chattering suppressing control can be performed in addition to an adaptive control by a machining load simulation. Of course, the chattering suppressing control may be performed alone.

Figure 3:
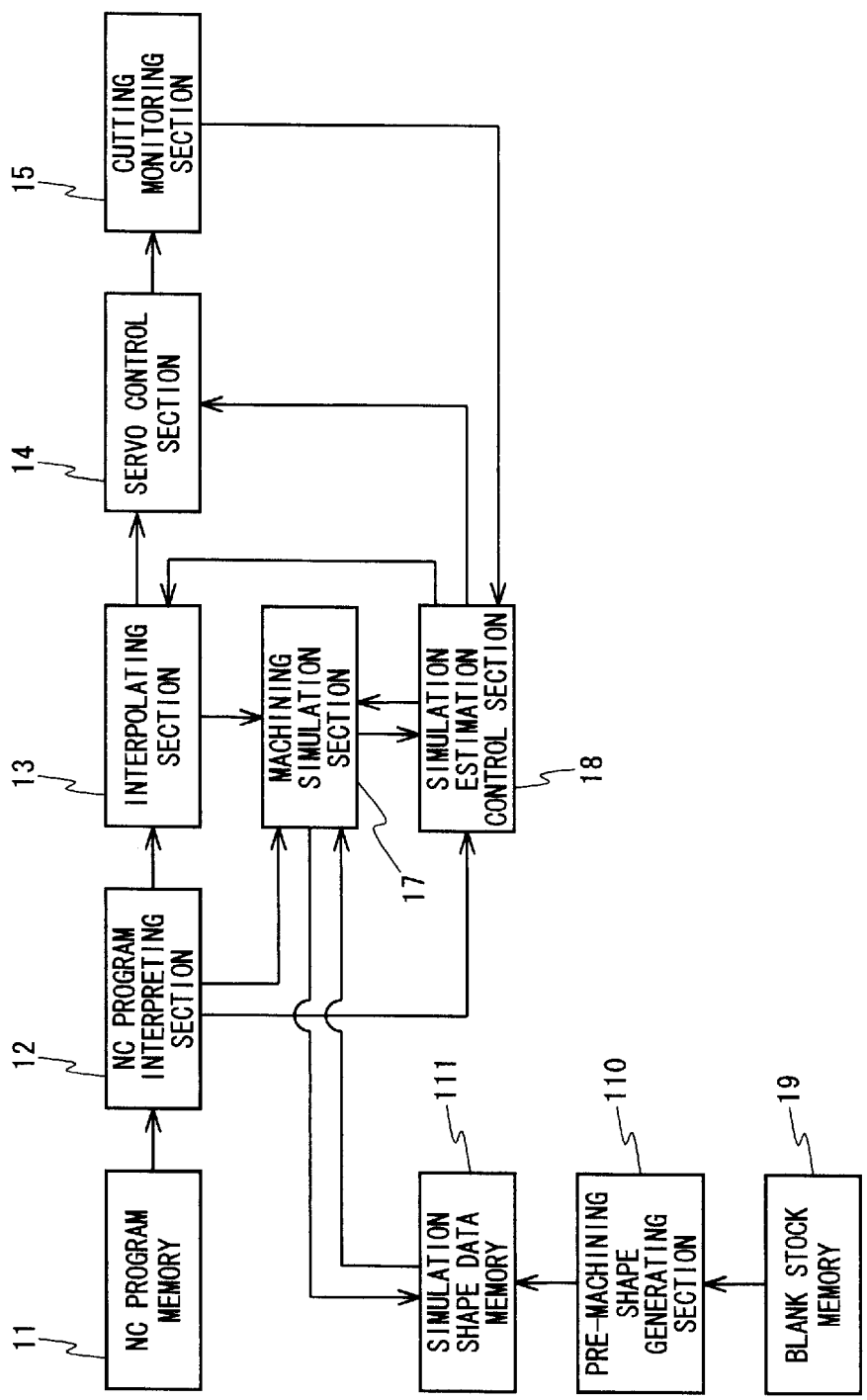
FIG. 3 is a block diagram of a machining simulation apparatus for NC machining in accordance with a first embodiment of the present invention.

A reference is made to a block diagram in FIG. 3 for the following explanation.

Figure 1:
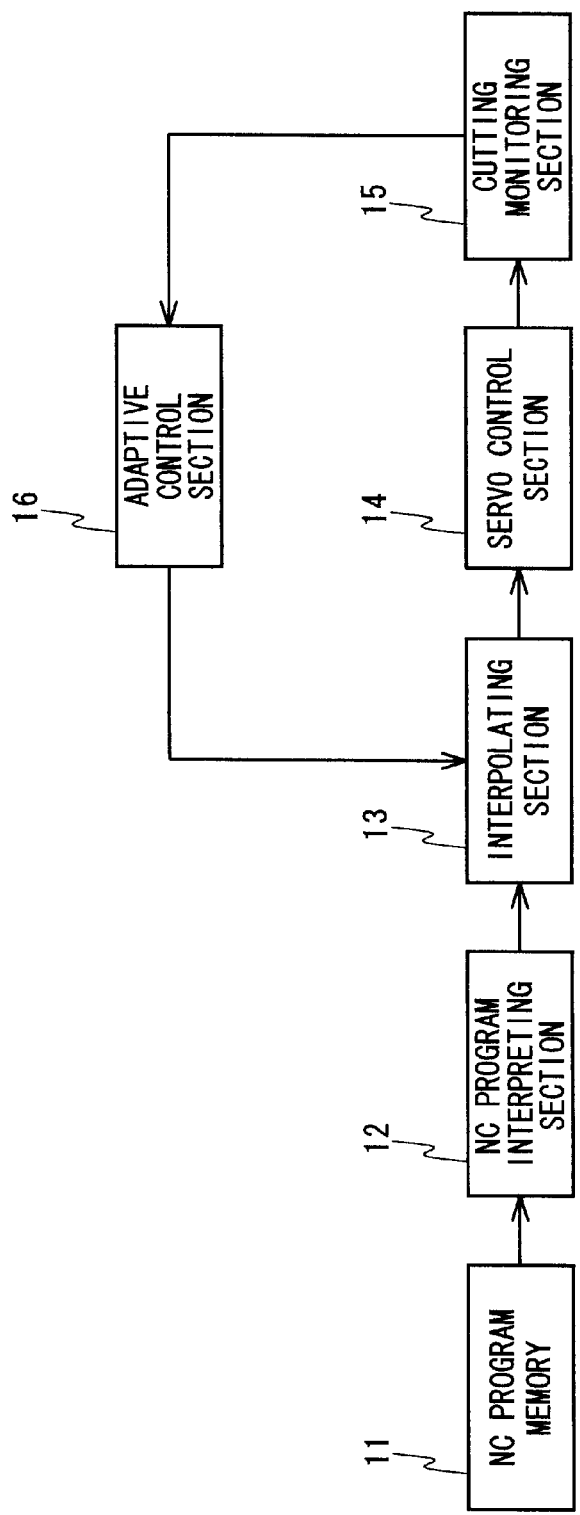
FIG. 1 is a block diagram of an adaptive control command generating system for a conventional numerical control system.

In this block diagram, the same components as those shown in the block diagram of FIG. 1 are denoted by the same reference numerals, and a block 16 is eliminated.

An NC program to be used for a machining operation is stored in an NC program memory 11.

An NC program interpreting section 12 reads NC program blocks on a one-by-one basis from the NC program memory 11, and interprets an NC program block to output an interpolation type, a target position and a feed rate specified in the current block or those specified on a modal basis in a previous block to an interpolating section 13, to output a tool number and a spindle rotation speed to a machining simulation section 17, and to output the tool number and the feed rate to a simulation estimation control section 18.

The interpolating section 13 calculates movement amounts $\Delta x$, $\Delta y$, $\Delta z$ along the respective axes per unit time (interpolation cycle period) on the basis of the interpolation type, the target position and the feed rate, and outputs the movement amounts to the machining simulation section 17.

A pre-machining shape generating section 110 reads blank stock shape data from a blank stock memory 19 provided in this system, and converts the blank stock shape data in a data configuration suitable for the machining simulation to be performed. The converted blank stock shape data is stored as machining simulation shape data in a simulation shape data memory 111 prior to the machining operation. Alternatively, an operator may input a blank stock shape when the machining simulation is to be performed, and the inputted data is stored as the machining simulation shape data in the simulation shape data memory 111 in the same manner as described above.

The pre-machining shape generating section 110 defines lattice points arranged in a predetermined spaced relationship in an X-Y plane which is coplanar to a bottom face of a blank stock as shown in FIG. 5(a), and judges on the basis of the blank stock shape data whether the blank stock is present above each of the lattice points in a Z-axis space. If present, a height h1 as measured from the blank stock bottom face is stored as a Z-axis coordinate value for the lattice point. If absent, "0" is stored as the Z-axis coordinate value for the lattice point. Thus, the blank stock shape data in the blank stock memory 19 is converted in the data configuration for use in the machining simulation, and the converted blank stock shape data is stored in the simulation shape data memory 111.

Where a hollow portion is present between solid portions of the blank stock above the lattice point in the Z-axis space as shown in FIG. 5(b), the data to be stored for the lattice point is not only one Z-axis coordinate value, but a plurality of Z-axis coordinate values, i.e., the height h1 of the solid blank stock portion, the height h2 of the hollow portion and the height h3 of the solid blank stock portion, are stored as the Z-axis coordinate data (in a coupled list configuration).

The machining simulation section 17 determines the shape (e.g., diameter) of a tool currently used for the machining on the basis of the tool number received from the NC program interpreting section 12 with reference to a to-be-used tool data memory provided in this system, and calculates a cutting amount per unit time on the basis of the tool diameter, the movement amounts $\Delta x$, $\Delta y$, $\Delta z$ received from the interpolating section 13, and the machining simulation shape data successively read out of the simulation shape data memory 111 as required. As will be described later, a cutting amount for each turn of the tool is calculated on the basis of the cutting amount per unit time and the spindle rotation speed.

Figure 6:
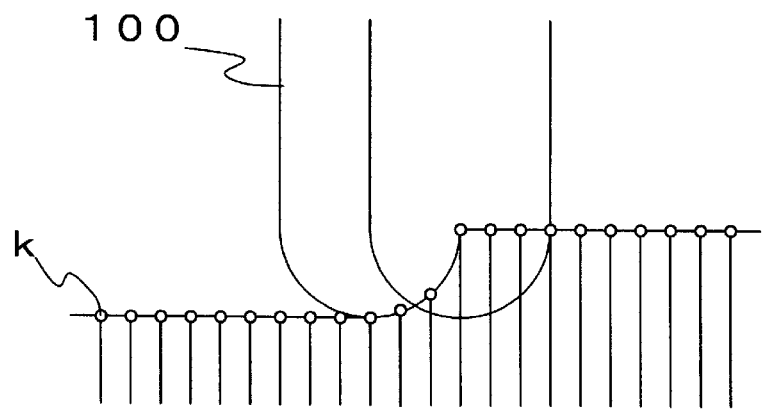
FIG. 6 is a diagram for explaining the principle of a machining simulation according to the present invention.
Figure 6:
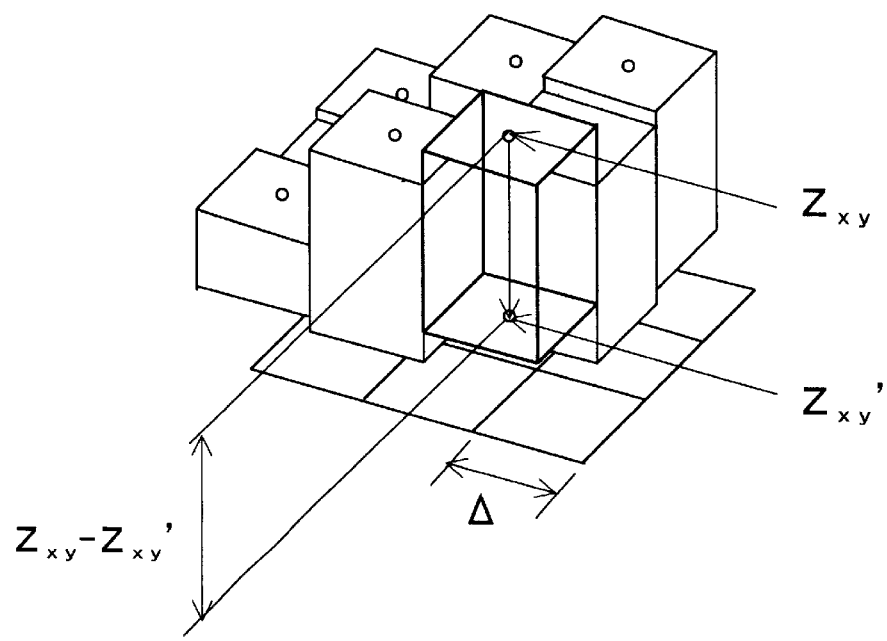

FIG. 6(a) is a diagram for explaining how to determine a machining region on the basis of a current tool position, and FIG. 6(b) is a diagram for explaining how to calculate the sum ($V_{REMOVED}$) of removed volumes. For determination of the cutting amount per unit time, which of the lattice points k defined in the predetermined spaced relationship in the X-Y plane the tool 100 passes through is determined on the basis of coordinate values X, Y of the current position of the tool 100, the tool diameter, and the movement amounts $\Delta x$, $\Delta y$ as shown in FIG. 6. Then, whether the tool cuts off a portion of the workpiece is judged on the basis of the Z-axis coordinate values of the lattice points k in the machining simulation shape data, a coordinate value Z of the current position of the tool 100, and the movement amount $\Delta z$. Further, the volume of the removed portion is calculated for each of the lattice points k, and the sum ($V_{REMOVED}$) of the removed volumes for the respective lattice points k is calculated from the following expression:

$$V_{REMOVED} = \Delta^2 \sum_x \sum_y (Z_{xy} - Z'_{xy})$$

wherein $V_{REMOVED}$ is the sum of the removed volumes, $Z_{xy}$ is a Z-axis height before the machining, and $Z_{xy}'$ is a Z-axis height after the machining.

At this time, whether the tool is actually moved on the basis of the movement amounts $\Delta x$, $\Delta y$, $\Delta z$ is unknown. Therefore, the machining simulation shape data is not updated according to the removal effected by the current tool movement based on the movement amounts $\Delta x$, $\Delta y$, $\Delta z$, nor stored in the simulation shape data memory 111.

Next, a load variation during each turn of the tool is determined.

In the case of a rotary tool such as an end mill, a variation in geometrical moment of cutting area with respect to a rotation center of a spindle is determined for the determination of the load variation during each turn of the tool.

Figure 9:
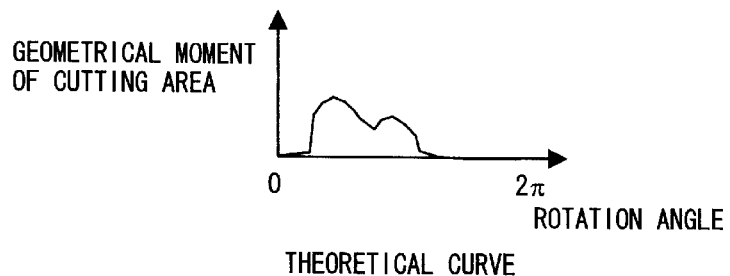
FIG. 9 is a diagram for explaining, by way of example, a change in geometrical moment of cutting area with respect to a rotation angle of each cutting tooth of a rotary tool in accordance with the present invention.

For example, the geometrical moment of cutting area with respect to a rotation angle for each tooth of the rotary tool varies as shown in FIG. 9.

By transforming the X-Y plane coordinate system into the cylindrical coordinate system (r, θ), the cutting amount Mrr for each turn of the spindle for each tooth can be expressed with the Z-coordinate value by the expression (1):

$$Mrr = \int_0^{2\pi} \int_0^R z(r, \theta) r \cdot dr\, d\theta \tag{1}$$

wherein R is the radius of the tool.

An one-turn angular range $0 \leq \theta \leq 2\pi$ is divided into [$\Delta\theta 0$, $\Delta\theta 1$, $\Delta\theta 2$, ..., $\Delta\theta n$]. A cutting amount $Mrr_i$ in each minute sub-range [0, θ1, θ2, ..., θn, 2π] is expressed by the expression (2):

$$Mrr_i = \int_{\theta_i}^{\theta_{i+1}} \int_0^R z(r, \theta) r \cdot dr\, d\theta [i: 0 \sim n] \tag{2}$$

The geometrical moment of cutting area at an angle θ is expressed by the expression (3):

$$S_i = \int_0^R z(r, \theta) r \cdot dr \tag{3}$$

Therefore, the cutting amount $Mrr_i$ in the minute sub-range obtained from the expression (2) is divided by a sub-range angle $\Delta\theta_i$ to provide an average geometrical moment of cutting area in a sub-range [$\theta_i$, $\theta_{i+1}$] as expressed by the expression (4):

$$S_i = \frac{Mrr_i}{\Delta\theta_i} \tag{4}$$

Figure 10:
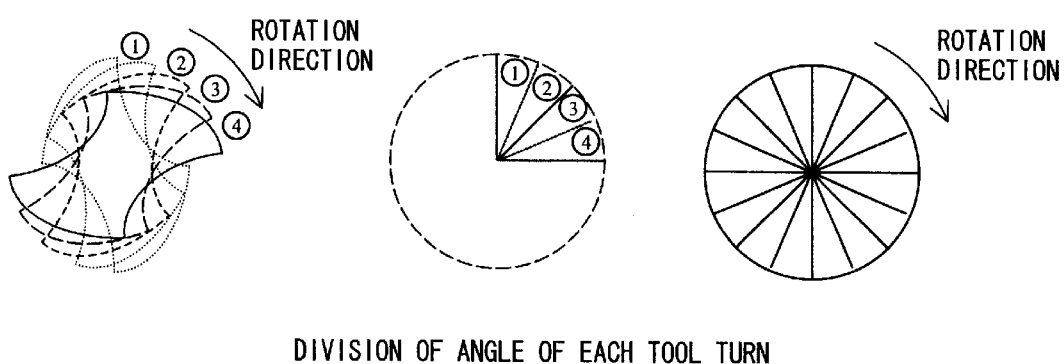
FIG. 10 is a diagram for explaining division of the rotation angle of the tool in accordance with the present invention.

For the aforesaid reason, the rotation angle range is divided into several sub-ranges each including a sufficient number of lattice points for the calculation of the cutting amount, and the cutting amount is determined for each of the sub-ranges as shown in FIG. 10.

Provided that Z-axis coordinate data of lattice points k in the sub-range [$\theta_i$, $\theta_{i+1}$] removed in the simulation is $Z_k$ and a distance from the tool center is $r_k$, the cutting amount in the sub-range [$\theta_i$, $\theta_{i+1}$] is expressed by the expression (5):

$$Mrr_i = \sum_k z_k r_k \tag{5}$$

Figure 11:
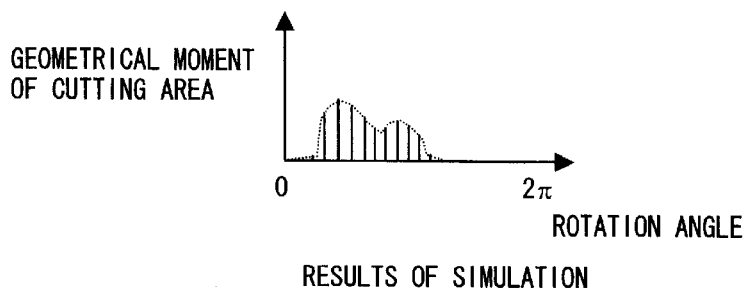
FIG. 11 is a diagram illustrating the geometrical moment of cutting area for each range of a divided tool rotation angle in accordance with the present invention.

By thus determining the cutting amount in each of the sub-ranges, the load variation during each turn of the tool can be determined as discrete data as shown in FIG. 11 (in which an area of each rotation angle sub-range represents the cutting amount in each sub-range). The result thus obtained is subjected to a frequency analysis by way of a frequency analyzing means such as a discrete Fourier transform, whereby the frequency of vibrations occurring due to a cutting resistance can be estimated.

Figure 12:
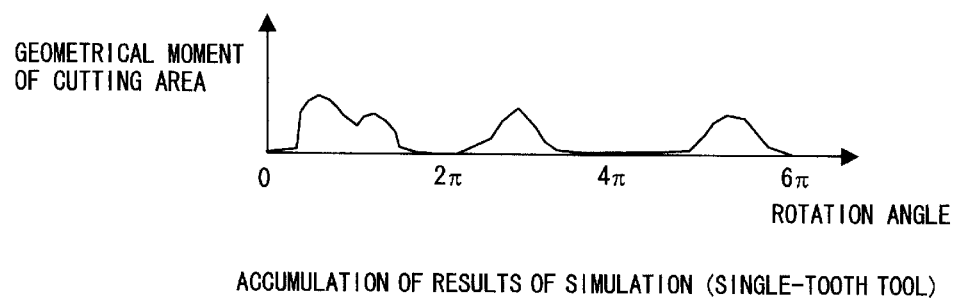
FIG. 12 is a diagram illustrating a load variation during each continuous turn of a single-tooth tool in accordance with the present invention.
Figure 13:
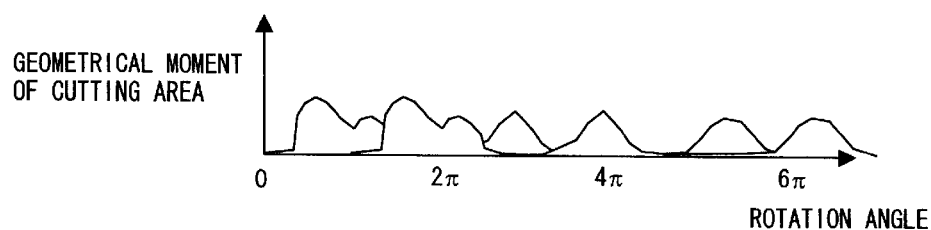
FIG. 13 is a diagram illustrating a load variation during each continuous turn of a double-tooth tool in accordance with the present invention.

Further, load variations during continuous turns are determined by connecting the results obtained for respective turns as shown in FIG. 12. In the case of a plural-tooth tool, simulation results for respective teeth are overlapped with each other to provide load variations for the entire tool as shown in FIG. 13. The vibration frequency due to the cutting resistance is determined by the frequency analyzing means such as the Fourier transform on the basis of the simulation result, which cannot be obtained from the pre-machining information such as the spindle rotation speed, the tool diameter and the cutting conditions alone. The vibration frequency thus determined is employed for the estimation of the vibrations due to the cutting operation.

The main component of the cutting vibrations is the forced-vibration frequency occurring due to the interrupted cutting with the use of the end mill, and the forced-vibration frequency may simply be calculated from the expression (6):

$$Fa = n \cdot k / 60 \qquad (6)$$

wherein Fa is the forced-vibration frequency, n is the number of teeth, and k is the spindle rotation speed ($min^{-1}$)

The natural frequencies of the machine, the tool, the jig and the workpiece are preliminarily determined through an experiment or an analysis, and registered.

If the vibration frequency or the harmonic frequency thereof which is an integral multiple thereof falls within a predetermined range with respect to the natural frequency of any of the these components, the spindle rotation speed is reduced to cause the vibration frequency to fall outside the range. This range is experimentally determined to be preliminarily stored.

The update of the spindle rotation speed may be achieved by applying a new spindle rotation speed to the NC program interpreting section, or by utilizing a spindle overriding function.

Thus, the spindle rotation speed to be employed for the actual cutting operation is determined, and a cutting amount for each turn of the spindle determined on the basis of this spindle rotation speed is outputted to the simulation estimation control section. The simulation estimation control section 18 calculates a machining simulation cutting resistance R and a cutting torque T on the basis of the cutting amount for each turn of the tool received from the machining simulation section 17 and the blank stock material preliminarily stored in this system.

For example, the simulation cutting resistance R and the cutting torque T of the end mill are determined as follows:

$$R = a \cdot Vp \; (kg \, f) \qquad (7)$$

$$T = b \cdot (n \cdot V) q \; (kg \, f \, cm) \qquad (8)$$

wherein V is a cutting volume for each turn, n is the number of teeth of the end mill, and a, b, p, q are characteristic parameters of the blank stock material.

Then, an optimum cutting resistance of the tool currently used for the machining is read out on the basis of the tool number received from the NC program interpreting section 12 with reference to the to-be-used tool data memory provided in this system.

Alternatively, the operator may set an optimum tool cutting resistance for each tool prior to the machining.

The simulation cutting resistance calculated from the above expression (7) is compared with the optimum cutting resistance. If the simulation cutting resistance deviates from the optimum cutting resistance, an optimum feed rate is calculated so as to provide the optimum cutting resistance, and outputted together with a re-interpolation request signal to the interpolating section 13.

The following expression is employed for the calculation of the optimum cutting speed.

$$Sg = S \cdot Rg / Rs \qquad (9)$$

wherein Sg is the optimum cutting speed, S is a command feed rate, Rg is the optimum cutting resistance, and Rs is the simulation cutting resistance.

On the other hand, if the simulation cutting resistance does not deviate from the optimum cutting resistance, a machining shape update signal is outputted to the machining simulation section 17, and a feed rate optimization signal is outputted to the interpolating section 13.

Upon reception of the machining shape update signal from the simulation estimation control section 18, the machining simulation section 17 updates the machining simulation shape data according to the removal effected by the current tool movement based on the movement amounts $\Delta x$, $\Delta y$, $\Delta z$, and stores the updated machining simulation shape data in the simulation shape data memory 111.

The update is achieved by subtracting the removed amount from the Z-axis coordinate value stored for each of the lattice points.

Upon reception of the feed rate optimization signal from the simulation estimation control section 18, the interpolating section 13 transfers the movement amounts $\Delta x$, $\Delta y$, $\Delta z$ as it is calculated at this time to a servo control section 14. As a result, the cutting operation is performed at a feed rate which is judged to provide the optimum cutting resistance.

If the re-interpolation request signal is received, on the other hand, all the data previously subjected to the interpolating process is discarded. Then, movement amounts $\Delta x'$, $\Delta y'$, $\Delta z'$ along the respective axes per unit time are calculated on the basis of the optimum feed rate received from the simulation estimation control section 18, and are outputted to the machining simulation section 17.

The machining simulation section 17 calculates a cutting amount for each turn of the tool on the basis of the movement amounts $\Delta x'$, $\Delta y'$, $\Delta z'$ in the same manner as described above, and outputs the cutting amount to the simulation estimation control section 18.

The simulation estimation control section 18 calculates a simulation cutting resistance on the basis of the cutting amount for each turn of the tool in the same manner as described above.

This simulation cutting resistance is based on the results of the interpolating process and the machining simulation performed on the basis of the optimum feed rate calculated by the simulation estimation control section 18, so that the cutting resistance does not deviate from the optimum cutting resistance as a matter of course. Therefore, the machining shape update signal is outputted to the machining simulation section 17, and the feed rate optimization signal is outputted to the interpolating section 13.

As a result, the interpolating section 13 performs the interpolating process on the basis of the optimum feed rate previously calculated by the simulation estimation control section 18 to calculate the movement amounts $\Delta x'$, $\Delta y'$, $\Delta z'$, which are outputted to the servo control section 14. Therefore, the cutting operation is performed at the feed rate which provides the optimum cutting resistance.

The cutting torque calculated from the above expression (8) may be compared with the cutting torque obtained through the previous interpolating process, and a torque feed forward amount may be calculated on the basis of a change from the previous cutting torque and outputted to the servo control section 14.

In this case, the servo control section 14 employs the torque feed forward amount for a torque control to provide a constant feed rate or a constant cutting speed.

A cutting monitoring section 15 receives an actually detected spindle load and feed axis loads from the servo control section 14, and constantly monitors a relationship between the loads and the simulation cutting resistance calculated on the basis of the optimum feed rate. If this relationship is not proportional, for example, the cutting monitoring section 15 promptly outputs a feed stop signal to the interpolating section 13 to interrupt the interpolating process.

In a machining simulation apparatus and method for NC machining according to a second embodiment of the present invention, a machining simulation is performed on the basis of blank stock shape data and an NC program generated on the basis of machining data inputted by an operator, and a speed command for the NC program is determined on the basis of a cutting amount determined on the basis of the results of the machining simulation or a cutting resistance and a spindle rotation speed determined on the basis of the cutting amount, so that a load variation frequency or a harmonic frequency thereof which is an integral multiple thereof falls outside a predetermined range including a natural frequency of a machine, a tool or a workpiece.

An explanation will hereinafter be given to the machining simulation apparatus for NC machining which is provided separately from a numerical controller.

Figure 4:
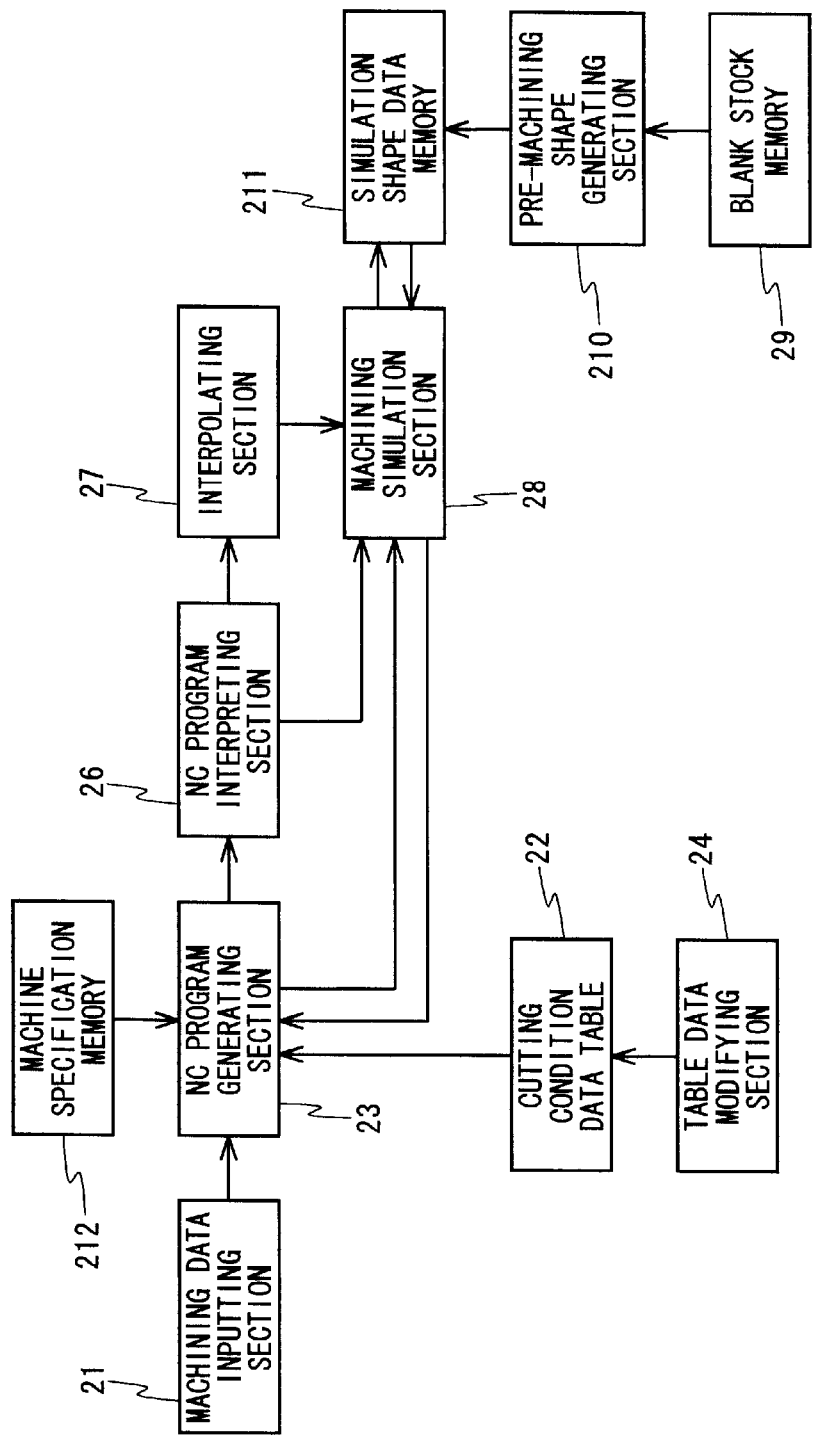
FIG. 4 is a block diagram of a machining simulation apparatus for NC machining in accordance with a second embodiment of the present invention.

A reference is made to a block diagram in FIG. 4 for the following explanation.

Figure 2:
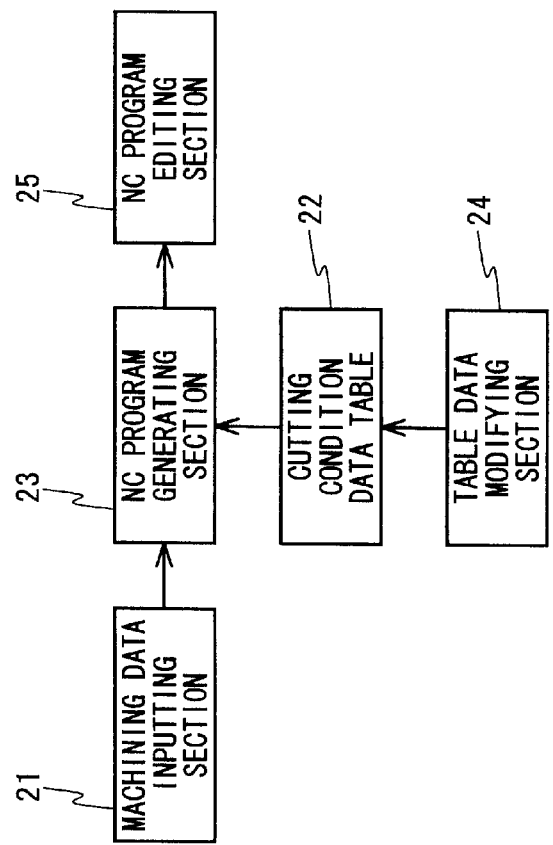
FIG. 2 is a block diagram of a conventional NC program generating system.

In this block diagram, the same components as those shown in the block diagram of FIG. 2 are denoted by the same reference numerals, and a block 25 is eliminated. For easier understanding, blocks equivalent or similar in function to those in the block diagram of FIG. 3 will be explained again, and denoted by different reference numerals.

The operator inputs information such as a tool type, a tool size, a blank stock material and a machining path which are required for the generation of the NC program to a machining data inputting section 21. The inputted result is outputted to an NC program generating section 23.

A cutting condition data table 22 is in a data table form which allows for determination of an optimum feed rate, an optimum spindle rotation speed and the like on the basis of the tool type, the tool size, the blank stock material and the like, and referred to by the NC program generating section 23.

The NC program generating section 23 generates the NC program on the basis of machining data such as the tool type, the tool size, the blank stock material and the machining path outputted from the machining data inputting section, and cutting conditions such as the feed rate and the spindle rotation speed read out of the cutting condition data table 22 on the basis of the tool type, the tool size, the blank stock material and the like.

An NC program interpreting section 26 reads NC program blocks on a one-by-one basis from the NC program generating section 23, and interprets an NC program block to output an interpolation type, a target position and a feed rate specified in the current block or those specified on a modal basis in a previous block to an interpolating section 27 and to output a tool number and a spindle rotation speed to a machining simulation section 28.

The interpolating section 27 calculates virtual interpolation movement amounts $\Delta x$, $\Delta y$, $\Delta z$ along the respective axes per unit time (e.g., an interpolation cycle period of a target NC device) on the basis of the interpolation type, the target position and the feed rate, and outputs the movement amounts to the machining simulation section 28.

A pre-machining shape generating section 210 reads blank stock shape data from a blank stock memory 29 provided in this system, and converts the blank stock shape data in a data configuration suitable for the machining simulation to be performed. The converted blank stock shape data is stored as machining simulation shape data in a simulation shape data memory 211 prior to the generation of the NC program. Alternatively, the operator may input a blank stock shape when the machining simulation is to be performed, and the inputted data is stored as the machining simulation shape data in the simulation shape data memory 211 in the same manner as described above.

Figure 5:
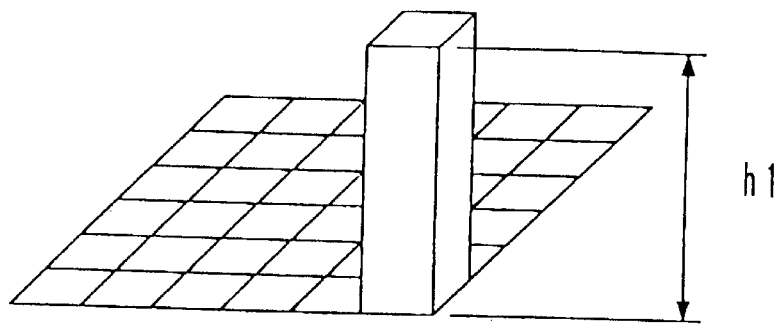
FIGS. 5(a) and 5(b) illustrate the configuration of simulation shape data according to the present invention.
Figure 5:
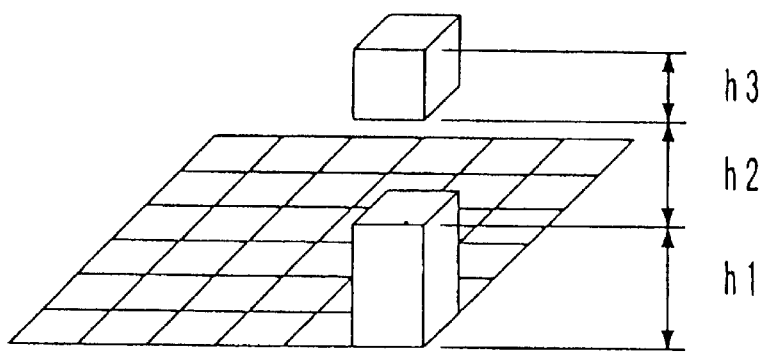

The pre-machining shape generating section 210 defines lattice points arranged in a predetermined spaced relationship in an X-Y plane which is coplanar to a bottom face of a blank stock as shown in FIG. 5($a$), and judges on the basis of the blank stock shape data whether the blank stock is present above each of the lattice points in a Z-axis space. If present, a height h1 as measured from the blank stock bottom face is stored as a Z-axis coordinate value for the lattice point. If absent, "0" is stored as the Z-axis coordinate value for the lattice point. Thus, the blank stock shape data in the blank stock memory 29 is converted in the data configuration for use in the machining simulation, and the converted blank stock shape data is stored in the simulation shape data memory 211.

Where a hollow portion h2 is present between solid portions of the blank stock above the lattice point in the Z-axis space as shown in FIG. 5($b$), the data to be stored for the lattice point is not only one Z-axis coordinate value, but a plurality of Z-axis coordinate values, i.e., the height h1 of the solid blank stock portion, the height h2 of the hollow portion and the height h3 of the solid blank stock portion, are stored as the Z-axis coordinate data (in a coupled list configuration).

The machining simulation section 28 determines the shape (e.g., diameter) of a tool currently used for the machining on the basis of the tool number received from the NC program generating section 23 with reference to a to-be-used tool data memory provided in this system, and calculates a cutting amount per unit time on the basis of the tool diameter, the movement amounts $\Delta x$, $\Delta y$, $\Delta z$ received from the interpolating section 27, and the machining simulation shape data successively read out of the simulation shape data memory 211 as required. Further, the machining simulation section 28 calculates a cutting amount for each turn of the tool on the basis of the cutting amount per unit time and the spindle rotation speed, and calculates a cutting amount for a predetermined unit angle. Furthermore, the machining simulation section 28 calculates the frequency of a component of a cutting load variation which has an amplitude falling outside a predetermined range.

The natural frequencies of the machine, the tool, the jig and the workpiece are preliminarily determined through an experiment or an analysis, and registered.

If the frequency of the cutting load variations or the harmonic frequency thereof which is an integral multiple thereof falls within a predetermined range with respect to the natural frequency of any of the these components, the spindle rotation speed is reduced to cause the load variation frequency to fall outside the range. This range is experimentally determined to be preliminarily stored.

A new spindle rotation speed is outputted to the NC program generating section 23. The NC program generating section modifies the program on the basis of the new spindle rotation speed outputted from the machining simulation section 28.

The machining simulation section 28 calculates a cutting amount for each turn of the spindle on the basis of this spindle rotation speed, and outputs the cutting amount to the NC program generating section 23.

The cutting amount per unit time can be calculated in the same manner as described above. More specifically, which of the lattice points defined in the predetermined spaced relationship in the X-Y plane the tool passes through is determined on the basis of coordinate values X, Y of a current position of the tool, the tool diameter, and the movement amounts $\Delta x$, $\Delta y$ as shown in FIG. 6. Then, whether the tool cuts off a portion of a workpiece is judged on the basis of the Z-axis coordinate values of the lattice points in the machining simulation shape data, a coordinate value Z of the current position of the tool, and the movement amount $\Delta z$. Further, the volume of the removed portion is calculated for each of the lattice points, and the sum of the removed volumes for the respective lattice points is calculated.

At this time, whether the tool is actually moved on the basis of the movement amounts $\Delta x$, $\Delta y$, $\Delta z$ is unknown. Therefore, the machining simulation shape data is not updated according to the removal effected by the current tool movement based on the movement amounts $\Delta x$, $\Delta y$, $\Delta z$, nor stored in the simulation shape data memory 211.

The NC program generating section 23 calculates a machining simulation cutting resistance R (expression (7)) and a cutting torque T (expression (8)) on the basis of the cutting amount for each turn of the tool received from the machining simulation section 28 and the blank stock material stored in the system.

Then, an optimum cutting resistance of the tool currently used for the machining is read out on the basis of the tool number with reference to the to-be-used data memory of this system.

Alternatively, the operator may set an optimum cutting resistance for each tool prior to the machining.

The simulation cutting resistance calculated from the above expression (7) is compared with the optimum cutting resistance. If the simulation cutting resistance deviates from the optimum cutting resistance, an optimum feed rate is calculated so as to provide the optimum cutting resistance.

The calculation of the optimum feed rate is based, for example, on the expression (9).

On the other hand, if the simulation cutting resistance does not deviate from the optimum cutting resistance, a machining shape update signal is outputted to the machining simulation section 28.

Upon reception of the machining shape update signal from the NC program generating section 23, the machining simulation section 28 updates the machining simulation shape data according to the removal effected by the current tool movement based on the movement amounts $\Delta x$, $\Delta y$, $\Delta z$, and stores the updated machining simulation shape data in the simulation shape data memory 211.

The update is achieved by subtracting the removed amount from the Z-axis coordinate value stored for each of the lattice points.

If the feed rate is calculated for the optimum cutting resistance, all the data previously subjected to the interpolating process is discarded. Then, movement amounts $\Delta x'$, $\Delta y'$, $\Delta z'$ along the respective axes per unit time are calculated again, and outputted to the machining simulation section 28.

The machining simulation section 28 calculates a cutting amount for each turn of the tool on the basis of the movement amounts $\Delta x'$, $\Delta y'$, $\Delta z'$ in the same manner as described above.

The NC program generating section 23 calculates a simulation cutting resistance on the basis of the cutting amount for each turn of the tool in the same manner as described above.

This simulation cutting resistance is based on the results of the virtual interpolating process and machining simulation performed on the basis of the optimum feed rate calculated by the NC program generating section 23, so that the cutting resistance does not deviate from the optimum cutting resistance as a matter of course. Therefore, the machining shape update signal is outputted to the machining simulation section 28.

The NC program generating section 23 calculates an optimum feed rate for each interpolation unit. If the optimum feed rate falls within a predetermined range in consecutive interpolation units, the interpolation units are combined together, and a proper F-command is added to the combined interpolation units. If the optimum feed rate falls outside the predetermined range in consecutive interpolation units, the interpolation units are separately handled in different blocks, and proper F-commands are added to the respective interpolation units. Thus, the initial NC program blocks are properly divided.

As a result of the calculation in the NC program generating section 23, a change in simulation cutting resistance from a non-zero value to zero, duration of a simulation cutting resistance of zero or a change in simulation cutting resistance from zero to a non-zero value is detected, whereby a transition from a cutting state to an air-cut state, a continuous air-cut state or a transition from the air-cut state to the cutting state is detected. Thus, the cutting feed rate can be set to a rapid feed rate preliminarily stored in a machine specification memory 212, increased to a maximum interpolation rate preliminarily stored in the machine specification memory 212, maintained at the increased rate, or changed to the optimum cutting feed rate from the increased rate.

In this embodiment, the machining simulation section 28 may be adapted to calculate a cutting amount per block and a machining time per block on the basis of a block path obtained from the NC program interpreting section 26 and judge the acceptability of the feed rate on the basis of such data for changing the F-command without the provision of the interpolating section 27.

On the other hand, where the operator preliminarily changes a basic feed rate, the operator inputs an instruction to a table data modifying section 24, for example, for changing a relational table indicative of a relationship of the tool type, the tool size, the blank stock material and the like with the feed rate, the spindle rotation speed and the like.

In a machining simulation apparatus and method for NC machining according to a third embodiment of the present invention, a machining simulation is performed on the basis of blank stock shape data and tool shape data on a real-time basis, and tool performance information is generated on the basis of data such as a cutting amount and a cutting portion obtained as a result of the machining simulation.

In any of the embodiments described above, data obtained through actual measurement on the workpiece and the tool may be used as the blank stock shape data and the tool shape data. The blank stock shape data may be corrected on the basis of the results of the actual measurement on the workpiece as shown in FIG. 7. Similarly, the tool shape data may be corrected on the basis of the results of the actual measurement on the tool.

Figure 8:
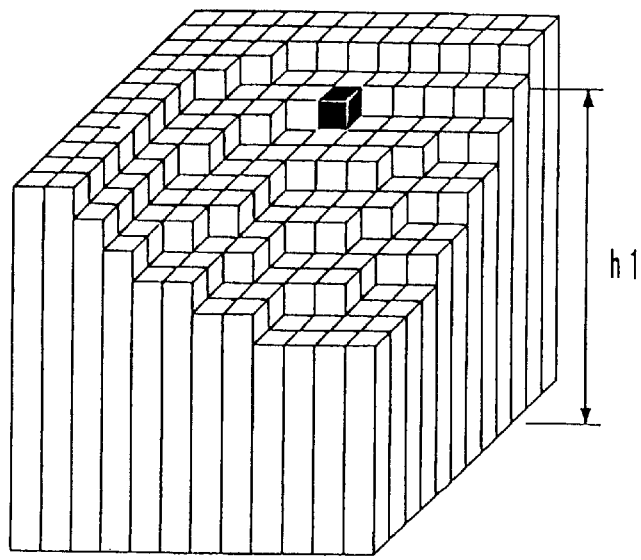
FIGS. 8(a) and 8(b) are diagrams illustrating, by way of example, the configuration of the simulation shape data obtained by defining the blank stock shape data by three-dimensional lattice points in accordance with the present invention.
Figure 8:
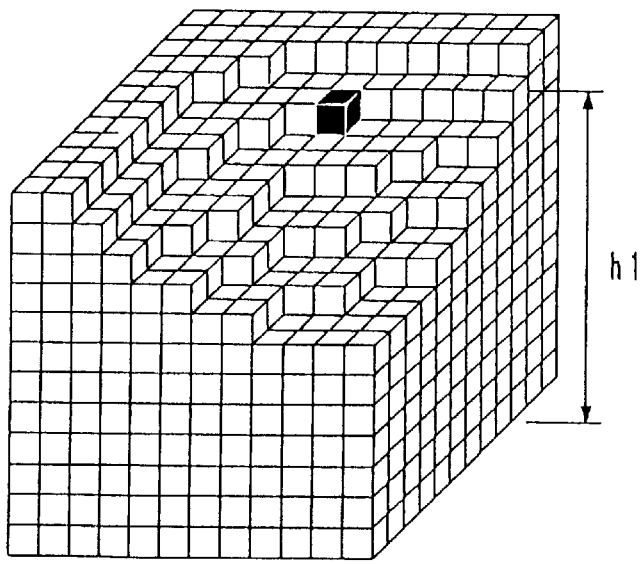

In any of the embodiments described above, the pre-machining shape generating section 110 (or 210) may be adapted to define the blank stock shape data read out of the blank stock memory 19 (or 29) by three-dimensional lattice points as shown in FIG. 8(b) when converting the blank stock shape data in the data configuration suitable for the machining simulation to be performed, and store the converted blank stock shape data in the simulation shape data memory 111 (or 211). Where the X-Y plane is defined by lattice points and the blank stock height is defined by Z-axis height data as shown in FIG. 8(a), for example, the data is changed from Z(x) (y)=h1 to (h1−1) when a portion highlighted in FIG. 8 is removed. Where the blank stock shape data is defined by the three-dimensional lattice points as shown in FIG. 8(b), the data is changed from P(x,y,h1)=1 to 0.

The first embodiment has been described on condition that: the machining simulation apparatus for the NC machining performs the feed rate control after the interpolating process; the machining simulation apparatus for the NC machining performs the spindle speed control for the suppression of the chattering after the output of a program command; and the machining simulation apparatus for the NC machining outputs a motor torque correction value to an electric current control section for a servo control.

The second embodiment has been described on condition that the machining simulation apparatus for the NC machining is provided separately from the numerical controller, and determines a speed command for the NC program prior to the machining.

The present invention is not limited to these embodiments, but the invention may be embodied by replacing the various means constituting the apparatus with process steps which realize the corresponding functions.

At least in the first and second embodiments, the cutting amount, the cutting resistance, the cutting vibration frequency, the pre-machining, in-machining and post-machining workpiece shapes, the optimum feed rate and the optimum spindle speed can be extracted as required in the aforesaid manner by preparing data equivalent to the blank stock shape, the tool shape and the interpolation data required to be inputted to the inventive apparatus in the inventive method, and inputting the equivalent data to the inventive apparatus in the inventive method.

Further, the optimum feed rate and the optimum spindle speed can be preliminarily be determined before the actual interpolating process by incorporating a feed rate control in the inventive apparatus or the inventive method between the NC program interpreting section and the interpolating section by utilizing the function of generating the optimum feed rate and the optimum spindle speed.

Where the numerical control system has a section for performing a pre-interpolation acceleration and deceleration process prior to the interpolating process for prevention of the vibration of the machine and the breakdown of the tool due to an abrupt change in feed rate or the variation in feed rate or for prevention of shape errors due to acceleration and deceleration, the feed rate control to be performed by the inventive apparatus or the inventive method may be incorporated between the NC program interpreting section and the pre-interpolation acceleration and deceleration section. Thus, the machining operation can be performed at the optimum feed rate without the vibration of the machine, and the shape errors due to the acceleration and deceleration can be suppressed.

Though not herein explained, the pre-machining, in-machining and post-machining workpiece shapes are successively generated, so that a graphic display function can be provided by inputting the workpiece shape data to a graphic display section. Similarly, a change in machining state can graphically be displayed by extracting the cutting amount and the cutting resistance and graphically displaying the cutting amount and the cutting resistance in a color-coded manner.

INDUSTRIAL APPLICABILITY

As described above, the machining simulation apparatus and method for the NC machining according to the present invention are suitable for NC machine tools such as machining centers, and particularly suitable for NC machine tools which are adapted to generate a numerical control command on the basis of a machining simulation.

What is claimed is:

1. A machining simulation apparatus for NC machining, which performs a machining simulation for the NC machining on the basis of machining information, the apparatus comprising:

machining simulation means for simulating a forced-vibration frequency and/or a load variation frequency occurring due to interrupted cutting on the basis of the machining information; and numerical control command generating means for generating a numerical control command on the basis of the interrupted-cutting forced-vibration frequency and/or load variation frequency obtained from the machining simulation means.

2. A machining simulation apparatus for NC machining as set forth in claim 1, wherein the machining information includes at least an NC program, blank stock shape data and tool shape data.

3. A machining simulation apparatus for NC machining as set forth in claim 2, wherein the machining simulation means calculates the interrupted-cutting forced-vibration frequency on the basis of a spindle rotation speed specified in the NC program and a tool tooth number specified in the tool shape data.

4. A machining simulation apparatus for NC machining as set forth in claim 2, wherein the machining simulation means includes:

blank stock shape data generating means which converts the blank stock shape data into machining simulation shape data defined by three-dimensional lattice points prior to the simulation;

simulation shape storage means for storing the machining simulation shape data; and cutting amount calculating means which calculates a cutting amount indicative of a volume to be removed when a tool passes through a portion of a blank stock represented by the lattice points on the basis of the NC program and the tool shape data, and updates information indicative of presence or absence of lattice points in the blank stock portion through which the tool passes in accordance with the removal, wherein the cutting load variation frequency is calculated on the basis of a spindle rotation speed specified in the NC program, the tool shape data and the cutting amount calculating means.

5. A machining simulation apparatus for NC machining as set forth in claim 2, wherein the machining simulation means includes:

blank stock shape data generating means which converts the blank stock shape data into machining simulation shape data by defining a bottom face of a blank stock specified in the blank stock shape data by lattice points and defining a height of the blank stock by vertical height data of each of the lattice points prior to the simulation;

simulation shape storage means for storing the machining simulation shape data; and cutting amount calculating means which calculates a cutting amount indicative of a volume to be removed when a tool passes through a portion of the blank stock represented by the lattice points on the basis of the NC program and the tool shape data, and updates the vertical height data of lattice points of the blank stock portion through which the tool passes in accordance with the removal, wherein the cutting load variation frequency is calculated on the basis of a spindle rotation speed specified in the NC program, the tool shape data and the cutting amount calculating means.

6. A machining simulation apparatus for NC machining as set forth in claim 5, wherein the vertical height data includes height data of a solid blank stock portion, or includes height data of a hollow blank stock portion in combination with height data of a solid blank stock portion.

7. A machining simulation apparatus for NC machining as set forth in claim 1, wherein the numerical control command generating means generates an NC program, NC program decode data obtained by decoding the NC program in a numerical controller, or a cutting speed determined on the basis of the NC program decode data so that the interrupted-cutting forced-vibration frequency and load variation frequency obtained from the machining simulation means or harmonic frequencies thereof which are integral multiples thereof fall outside a predetermined range including a natural frequency of a machine, a tool, a jig or a workpiece.

8. A machining simulation apparatus for NC machining as set forth in claim 2, wherein the blank stock shape data is shape data obtained through the machining simulation on the basis of inputted workpiece shape data, or data obtained by correcting a part of the shape data obtained through the machining simulation with the use of shape data obtained by actual measurement on a workpiece.

9. A machining simulation apparatus for NC machining as set forth in claim 2, wherein the tool shape data is data obtained by correcting inputted tool shape data with the use of shape data obtained by actual measurement on a tool.

10. A machining simulation method for NC machining, which performs a machining simulation for the NC machining on the basis of machining information, the method comprising:

a machining simulation step for simulating a forced-vibration frequency and a load variation frequency occurring due to interrupted cutting on the basis of the machining information; and a numerical control command generating step for generating a numerical control command on the basis of the interrupted-cutting forced-vibration frequency and load variation frequency obtained in the machining simulation step.

11. A machining simulation method for NC machining as set forth in claim 10, wherein an NC program, NC program decode data obtained by decoding the NC program in a numerical controller, or a cutting speed determined on the basis of the NC program decode data is generated so that the interrupted-cutting forced-vibration frequency and load variation frequency obtained from machining simulation means or harmonic frequencies thereof which are integral multiples thereof fall outside a predetermined range including a natural frequency of a machine, a tool, a jig or a workpiece in the numerical control command generating step.

12. A medium storing thereon a program which causes a computer to perform a machining simulation step for simulating a forced-vibration frequency and a load variation frequency occurring due to interrupted cutting on the basis of machining information, and a numerical control command generating step for generating a numerical control command on the basis of the interrupted-cutting forced-vibration frequency and load variation frequency.

13. A medium as set forth in claim 12, wherein an NC program, NC program decode data obtained by decoding the NC program in a numerical controller, or a cutting speed a determined on the basis of the NC program decode data is generated so that the interrupted-cutting forced-vibration frequency and load variation frequency or harmonic frequencies thereof which are integral multiples thereof fall outside a predetermined range including a natural frequency of a machine, a tool, a jig or a workpiece by the program for performing the machining simulation step.

* * * * *